Oct. 29, 1935.  C. W. VOGT  2,018,751
DEVICE FOR FILLING ICE CREAM CONES
Filed June 29, 1933
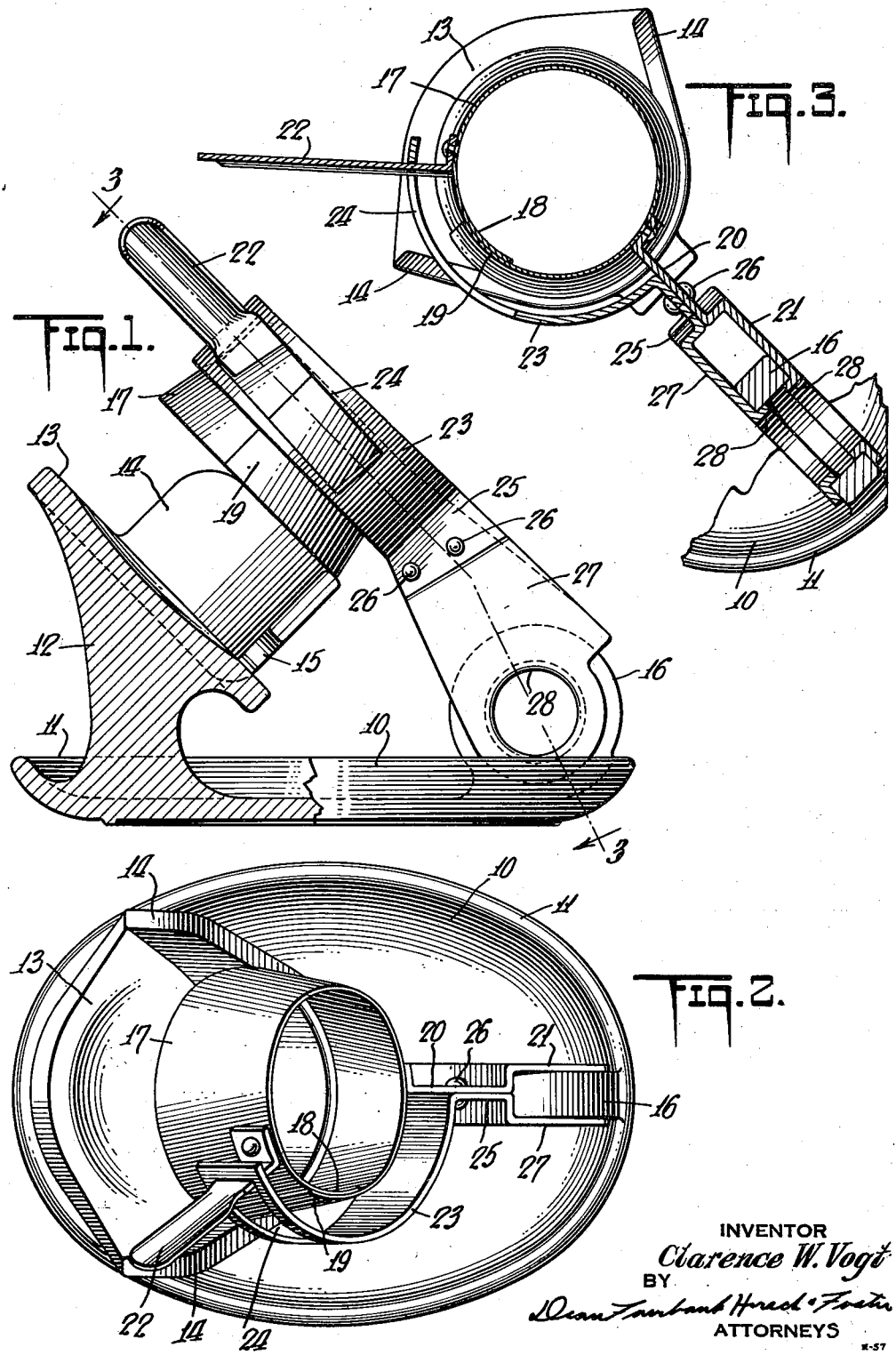
INVENTOR
Clarence W. Vogt
BY
ATTORNEYS Patented Oct. 29, 1935

2,018,751

UNITED STATES PATENT OFFICE 2,018,751

DEVICE FOR FILLING ICE CREAM CONES

Clarence W. Vogt, Louisville, Ky., assignor, by mesne assignments, to Vogt Processes, Incorporated, Louisville, Ky., a corporation of Delaware Application June 29, 1933, Serial No. 678,143

11 Claims. (Cl. 107—8)

In the ordinary method of making up an ice cream cone, the ice cream is scooped up from a large can by a dipper and then deposited on the open end or mouth of a wafer cone. Due to the adherence of the ice cream to the walls of the dipper, the transfer of the ice cream to the cone is attended with a certain amount of difficulty, and the ice cream sometimes falls off the cone during the operation. Furthermore, the ice cream is usually merely seated upon the mouth of the cone and has no substantial portion thereof extending into the interior of the cone unless the cream be forced down into the cone, but this acts to further compact it, knock out the overrun and render the ice cream less palatable. The result is that the ice cream will sometimes slide or fall off the cone when this cone is tilted as is often the case when handled by children, or leave only the empty cone minus the ice cream, or may be pushed off the cone during the process of eating it.

In my Patent No. 1,906,183 there is disclosed a small package of ice cream in the form of a cylindrical block and which may be and as now commercially made and sold is of suitable size to be dispensed as an individual portion. This portion is of a size which permits it to be served in a dish or soda glass, but which will not permit it to extend to any substantial distance in the interior of the usual size of wafer cone.

One object of the present invention is to provide means whereby an ice cream portion of the general form shown in the patent above referred to may be readily shaped to fit firmly in a cone of the usual size.

Another object is to provide a device for tapering one end of a block of ice cream without mashing or deforming the body of the block, and without materially reducing the volume thereof, or reducing the overrun.

A further object is to provide means for supporting a block of ice cream in position to be easily fitted into a cone and to be easily picked up by said cone.

As an important feature of the present invention, the shaping or molding device includes an annular member or band adapted to encircle a portion of the ice cream block, and means for contracting or tightening said member to apply peripheral pressure to the ice cream to mold or reshape the latter. This member preferably comprises a flexible metal plate curved into annular shape, with the ends overlapping, and having inherent resiliency for urging said member in expanded position. The overlapping ends of the plate are free to move relatively to permit expansion and contraction of the curved plate, said plate being curved in frusto-conical form when contracted, so that the end portion of the ice cream block to be inserted in the cone is correspondingly shaped.

The molding device is constructed to permit the free elongation of the ice cream block while pressure is being peripherally applied thereto, so that no substantial reduction in the volume of the ice cream being molded takes place, and no consequent loss of overrun occurs.

The molding device may be detachably secured to a receptacle or ice cream block support so that when attached it may be easily guided into molding position with respect to an ice cream block held in the receptacle, and operated to taper the block before the cone is applied and used to pick up the block, with the ice cream therein.

As another feature of the present invention, the receptacle or ice cream support is constructed to permit the cone to embrace the ice cream block while said block is supported in said receptacle, and to permit the block to be easily removed from the receptacle by the cone. For that purpose, the receptacle has an opening on one side, which permits the transverse movement of the block in and out of the receptacle, and is low enough to expose the upper portion of the ice cream block to permit the mouth of the cone to be moved into engagement with said exposed portion. The receptacle is tilted so that the ice cream block may be moved transversely out of the receptacle by the cone and the cone angularly turned in upright dispensing position without dropping the ice cream block therefrom. This receptacle may be used independently of the molding device or the molding device may be removed, the entry of the ice cream block into the cone being effected solely by forcing the cone onto the block. The molding device may be used independently of and separate from the support if desired.

In the accompanying drawing, there is shown for the purpose of illustration, only one form of apparatus embodying the present invention. In the drawing:

Fig. 1 is a side elevation of the apparatus, a portion being shown in section.

Fig. 2 is a top plan view, and

Fig. 3 is a section on the line 3—3 of Fig. 1.

In the specific construction illustrated, there is provided a base 10 which may be in the form of a shallow tray or receptacle, and which is illustrated as of substantially elliptical form and having an upstanding peripheral wall 11 so that any ice cream which may drop from the operating apparatus will be caught and retained.

Extending upwardly from the receptacle and preferably adjacent to one end thereof is a pedestal or upright 12 terminating in a plate or support 13 which is tilted at an angle of approximately 45° to the general plane of the base or receptacle 10. This plate 13 may be of substantially circular or any other desired form, and of such diameter as will enable the plate to form a base for the block of ice cream which is to be inserted in the cone.

At the lower and lateral edges of the plate, there is provided an upstanding wall 14 which may be disposed substantially at right angles to the plate 13 and therefore at an angle of substantially 45° to the base 10, and which forms a cup-like receptacle with said plate 13. This wall does not extend along the upper edge of the plate 11 so that the block may be inserted or removed by a lateral movement in the direction parallel to the plate 13 and into engagement with the wall 14. Preferably the wall 14 has an aperture 15 at its lower edge so that any ice cream which may melt on the receptacle formed by the walls 13 and 14 may drop or fall through the opening 15 into the main receptacle or tray formed by the base. In using this apparatus a block of ice cream such for instance as that shown in my prior Patent No. 1,906,183 is placed in the receptacle formed by the walls 13 and 14 and with its axis extending parallel to the wall 14 and at right angles to the wall 13. The wall 14 is of such height that it extends up only along a portion of the length of the block of ice cream and leaves the upper end exposed for the action of the contracting mechanism and for the application of the cone.

I have illustrated the parts 10, 11, 12, 13 and 14 as being integral, but of course, this is not in any way essential as they may be made up of separate parts permanently or detachably secured together. They are preferably molded from a single piece of glass, porcelain or other analogous material, but may be made of sheet metal or other material.

The base 10 also is provided with a pivotal support for the contracting or shaping mechanism and this support may be so designed as to serve as a handle if the contracting mechanism be removed and is not employed. As shown, this pivotal support is in the form of an upwardly extending projection 16 of annular or ring form, and having a central aperture which may serve as a finger hole to facilitate the picking up of the receptacle. This projection 16 is preferably adjacent to the end of the base 10 opposite to the upright 12 and the plate 13 is tilted toward the upright handle or pivotal support 16.

The contracting mechanism is illustrated as an annular band 17 of sheet metal with the end portions 18 and 19 overlapping but not directly connected together. The band is not cylindrical but is preferably flared in the form of a truncated cone and has its larger end of a diameter larger than the block of ice cream, when the band is in expanded position, and the flare of the wall of the band may be substantially the same as that of an ordinary ice cream cone. The band is riveted or otherwise secured to or carried by an arm 20 and this arm has an extension 21 for engaging the support 16. The band is sufficiently resilient to permit of the expansion and contraction thereof by varying the amount of overlapping of the ends 18 and 19, and has inherent resiliency normally holding it in expanded position.

For contracting the band, there is provided an arm 22 which is riveted or otherwise secured to the end portion 18 of the band at a point spaced from the terminal of the latter to the proper distance beyond the terminal of the end 19. The normal distance between the arm 22 and the end 19 is such that when the arm 20 has been moved into engagement with the end 19, the diameter of the band 17 will have been reduced to the proper extent to deform an ice cream block and permit it to be properly inserted in the cone.

For guiding the arm 20 and controlling the movement of the band during the contracting and expanding movements, there is provided a guide member 23 which follows the general outline of the band but is curved about a larger radius and spaced from the band. This guide member 23 may include a cylindrical section rather than a conical one. The guide 23 is provided with a slot 24 through which the arm 22 extends, and one end of this slot serves as a stop to limit the movement of the arm and thus define the maximum expansion of the band. The guide 23 may be formed integral with an arm 25, and the arms 20 and 25 may be rigidly secured together by any suitable means, as for instance by the use of a pair of rivets 26.

The arm 25 has an extension 27 similar to the extension 21 and adapted to engage the opposite side of the upright handle or pivotal support 16. The two extensions 21 and 27 are not secured together at their lower ends, but have sufficient resiliency so that they may be spread apart to permit the support 16 to be inserted therebetween. As illustrated, each of the extensions 21 and 27 has an annular flange 28 of a diameter substantially equal to that of the aperture in the support 16 so that when the extensions 21 and 27 are spread apart and applied on opposite sides of the support 16, the flanges may enter the aperture of the latter and serve as retaining means and also as bearings about which the arms 20 and 25 with the contracting mechanism may be swung toward and from the plate 13 and the block of ice cream carried thereby.

The parts are shown in the position which they occupy during the shaping of a block of ice cream. In operation the contracting mechanism is swung to the right from the position shown in Fig. 1 and the block of ice cream is placed on the supports 13—14, with its axis at right angles to the plate 13. The contracting mechanism is then moved to the position shown in the drawing, and by moving the arm 22 the band 17 is contracted and the ice cream block is deformed to give a truncated cone shape to the extremity, so that it will properly fit within the end of an ice cream cone.

Upon releasing the handle 22, the band will expand and free itself from the block of ice cream, and the contracting mechanism may then be swung to the left and away from the block. An ice cream cone may then be moved endwise in a direction at right angles to the plate 13 and on to the end of the ice cream block, and sufficient pressure may be applied to force the block slightly into the cone.

By tilting the cone about the upper edge of the lower part of the wall 14, the block of ice cream may be picked up by the cone and will be ready for dispensing or eating. It will be noted that there is no upper end wall to the contracting mechanism so that during the contraction of the band 17, the ice cream may flow freely endwise, and during molding or reshaping the pressure does not knock out an excessive amount of the overrun or reduce to any appreciable extent the volume of the block.

It will be obvious that the contracting mechanism may be entirely removed or may be left in inoperative position, and the cone may be forced directly on to the block of ice cream on its support. This may prove satisfactory in some cases, particularly if the ice cream is not too soft, and particularly if the upper portion of the cone, instead of being conical, is more nearly cylindrical. The apparatus without the contracting mechanism is very convenient for the filling of ice cream cones and the picking up of the ice cream in the cone independently of any molding or reshaping prior to the application of the cone.

The invention is particularly advantageous for operating on an ice cream package of the type shown in the patent above referred to. In this patent, there is disclosed a cylindrical solid block of ice cream and a wrapper including a pair of sections of sheet material, each of a width substantially equal to the length of the block and of slightly greater length than half of the circumference of the block, one end of each section overlapping one end of the other section, and the overlapping ends of both sections being bent outwardly to form tabs, whereby upon pulling said tabs in opposite directions, the wrapper is removed from the block. This type of ice cream package including its wrapping may be unpeeled and the unwrapped portion dropped on the plate 13. If the ice cream tends to stick to the paper, the edges of the side walls 14 help in the unpeeling. The wrapper sections may then be peeled off the ice cream block by pulling the tabs while said block is retained on the plate 13.

It will, of course, be obvious that I am not limited to the use of ice cream blocks of any particular shape and that the apparatus may be modified in details to adapt it to any particular size or shape of block and still operate effectively to mold or reshape the block to fit into the cone.

The apparatus is very simple and the contracting mechanism may be readily removed to facilitate thorough washing and sterilizing. The contracting mechanism is formed of simple sheet metal parts which may be readily assembled so that the cost of manufacture is very low. Various other types of pivotal supports may be employed, or in some cases the arms 20 and 25 may merely serve as a handle which may be held in one hand while the band 17 is placed around the block and the arm 22 operated to reshape the block. Thus, the use of pivotal connections and the attachment of the contracting mechanism to the base is desirable but not essential to the securing of the desired results.

Having thus described my invention, what I claim as new and desire to secure by Letters Patent is:—

1. An apparatus for reducing the size of one end of an ice cream block, whereby it may be fitted into the mouth of a cone, and including a base plate, a cup-like receptacle supported on said base plate at an angle with respect thereto, and adapted to support said ice cream block at an angle with respect to said plate, and a molding device connected to said base plate for shaping one end of said block whereby said block may be fitted into the mouth of a cone.

2. An apparatus for tapering one end of an ice cream block, whereby said end may be fitted into the mouth of a cone, and including a base member, a receptacle connected to said base member for supporting the ice cream block in position, an annular molding device pivotally mounted on said base member, and movable about its pivotal connection into a position encircling said block supported in said receptacle, and means for contracting said device to mold said block.

3. An apparatus for tapering one end of a cylindrical ice cream block, whereby said end may be fitted into the open end of a cone, and including a base member, a receptacle connected to said base member and adapted to support the block, an arm connected at its lower end to said base member, a constricting band connected to the other end of said arm, said arm being of such a length and pivoted to the base member in such a position whereby said arm may be swung about its pivotal connection to slip said band onto an ice cream block supported in said receptacle, and means for tightening said band around said block.

4. An apparatus for tapering one end of an ice cream block, whereby said end may be fitted into the mouth of a cone, and including a base, an arm having a resilient portion at one end and adapted to detachably and pivotally engage with said base, and means connected to the other end of said arm for applying peripheral pressure to said ice cream block to reduce the cross-section of an end portion thereof, whereby said reduced portion of the block may be fitted into a cone.

5. A device for tapering one end of an ice cream block, including a band adapted to encircle said block and forming a frustro-conical casing open at both ends, and having one end thereof fixed and the other end in overlapping relationship therewith and free to move, and a handle secured to said band adjacent to the last mentioned end of said band for coiling and contracting said band into a smaller frusto-conical form to correspondingly constrict one end of an ice cream block into tapered form, whereby the tapered end of said block may be fitted into an ice cream cone.

6. In combination, means for supporting an ice cream block, and means pivotally connected thereto for constricting an end portion of said ice cream block into tapered form while said block is supported in said supporting means, said constricting means permitting the free elongation of said portion while it is being constricted.

7. An apparatus of the class described, including a base member, a cup-like member supported on said member, extending substantially at an angle of 45° with respect thereto, and adapted to support a cylindrical block of ice cream with the end portion thereof exposed, an arm pivotally connected at one end to said base member, and means connected to the other end of said arm for constricting the exposed portion of said block into tapered form.

8. A receptacle having a member upstanding adjacent to one edge and presenting an annular wall, and adapted to serve as a handle, a post portion within the receptacle, a top plate on said post and disposed in a tilted position, a substantially U-shaped flange forming a peripheral wall for the lower and lateral edges of said plate and adapted to support a block of plastic material inclined towards said member, and means adapted to be detachably secured to and pivoted on said member for contracting said plastic block while on said plate.

9. The method of reshaping a cylindrical block of ice cream so that an end portion thereof will have a tapered form to permit the insertion of said end portion into the mouth of a cone, including a step of applying peripheral pressure to the portion of the ice cream block adjacent to one end thereof to taper said portion while permitting the free elongation of said portion.

10. The method of reshaping a cylindrical block of ice cream adjacent to an end portion thereof so that said portion may be fitted into the mouth of a cone, including the steps of supporting said block in a tilted position with said end portion exposed, and applying circumferential pressure to the exposed portion of said ice cream block to reduce its cross-section, while permitting said exposed portion to be elongated, whereby the volume of the original exposed portion is not substantially reduced.

11. The method of reshaping a cylindrical block of ice cream adjacent to an end portion thereof, including the steps of supporting said block on one end with the opposite end exposed, and applying circumferential pressure to the periphery of said ice cream block to reduce its cross-section, while permitting said exposed portion to be elongated, whereby the volume of the originally exposed portion is not substantially reduced.

CLARENCE W. VOGT.